US008035503B2

(12) United States Patent
Partin et al.

(10) Patent No.: US 8,035,503 B2
(45) Date of Patent: Oct. 11, 2011

(54) VEHICLE LOCATION REMINDER SYSTEM AND METHOD

(75) Inventors: Dale L. Partin, Ray Township, MI (US); Michel F. Sultan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 352 days.

(21) Appl. No.: 12/316,012

(22) Filed: Dec. 9, 2008

(65) Prior Publication Data

US 2010/0141412 A1 Jun. 10, 2010

(51) Int. Cl.
*B60Q 1/00* (2006.01)

(52) U.S. Cl. ................. 340/457; 340/426.1; 340/426.18

(58) Field of Classification Search .................. 340/457, 340/457.1, 426.1, 426.13, 426.15, 426.16, 340/426.18, 426.19, 426.2, 426.22, 438, 340/539.21; 342/357.5, 457, 357.07
See application file for complete search history.

(56) References Cited

U.S. PATENT DOCUMENTS

| | | | | |
|---|---|---|---|---|
| 5,055,851 | A * | 10/1991 | Sheffer | 342/457 |
| 6,611,229 | B2 * | 8/2003 | Muramatsu et al. | 342/357.57 |
| 7,295,920 | B2 | 11/2007 | Finkelstein | |
| 7,446,648 | B2 * | 11/2008 | Ghabra | 340/426.36 |
| 7,796,021 | B2 * | 9/2010 | Saban | 340/438 |
| 2006/0106504 | A1 * | 5/2006 | Carpenter | 701/1 |

* cited by examiner

*Primary Examiner* — Van T. Trieu
(74) *Attorney, Agent, or Firm* — Jimmy L. Funke

(57) ABSTRACT

A vehicle location reminder system having a vehicle positioning system operable to provide an approximate location of a vehicle and record the approximate location of the vehicle. A status check system monitors use of the vehicle and sends a signal to the vehicle positioning system to record the approximate location of the vehicle when the vehicle is no longer in use. A memory system is connected to the status check system and the vehicle positioning system, the memory system being adapted to determine if the approximate location of the vehicle, when no longer in use, is in a familiar location. An alert system is connected to the memory system. The alert system prompts a vehicle user to record data on a mobile device pertaining to the approximate location of the vehicle when the location of the vehicle, when no longer in use, is not in a familiar location. A replay system is adapted to replay the recorded data.

18 Claims, 5 Drawing Sheets

VEHICLE LOCATION REMINDER SYSTEM AND METHOD

TECHNICAL FIELD

The present invention relates to a vehicle location reminder system and the like, and in particular to a vehicle location reminder system that prompts a vehicle user to record the approximate position of the vehicle when the vehicle is no longer in use.

BACKGROUND OF THE INVENTION

A vehicle location is sometimes forgotten when a driver leaves the vehicle.

SUMMARY OF THE INVENTION

One aspect of the present invention includes a vehicle location reminder system having a vehicle positioning system operable to provide an approximate location of a vehicle and record the approximate location of the vehicle. A status check system monitors use of the vehicle and sends a signal to the vehicle positioning system to record the approximate location of the vehicle when the vehicle is no longer in use. A memory system is connected to the status check system and the vehicle positioning system, the memory system being adapted to determine if the approximate location of the vehicle, when no longer in use, is in a familiar location. An alert system is connected to the memory system wherein the alert system prompts a vehicle user to record data pertaining to the approximate location of the vehicle when the location of the vehicle, when no longer in use, is not in a familiar location. A replay system is provided that replays recorded data.

Another aspect of the present invention includes a vehicle location reminder system having a vehicle positioning system operable to provide an approximate location of a vehicle and record the approximate location of the vehicle. A status check system monitors passenger use of the vehicle and sends a signal to the vehicle positioning system to record the approximate location of the vehicle when the vehicle has been vacated. A memory system is connected to the status check system and the vehicle positioning system, the memory system being adapted to determine if the approximate location of the vehicle when the vehicle has been vacated is a familiar location. An alert system is connected to the memory system and prompts a vehicle driver to record data pertaining to the approximate location of the vacated vehicle when the approximate location of the vehicle is not a familiar location. A mobile device has an information recording system that is adapted to record and store data related to the approximate location of the vehicle.

In another aspect of the present invention, a method for determining the location of a vehicle includes steps of installing a vehicle positioning system into a vehicle, installing a notification system into a vehicle and providing a module that evaluates when the vehicle is no longer in use. The vehicle positioning system records the last known approximate location of the vehicle when no longer in use and evaluates whether the last known approximate location is a familiar location. The vehicle location information is sent from the notification system and global positioning satellite system to an alert system. An alert is sent from the module to a vehicle driver when the vehicle is no longer in use and when the approximate location information is determined to not be familiar. A recording device is provided for receiving approximate location data from the vehicle driver.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
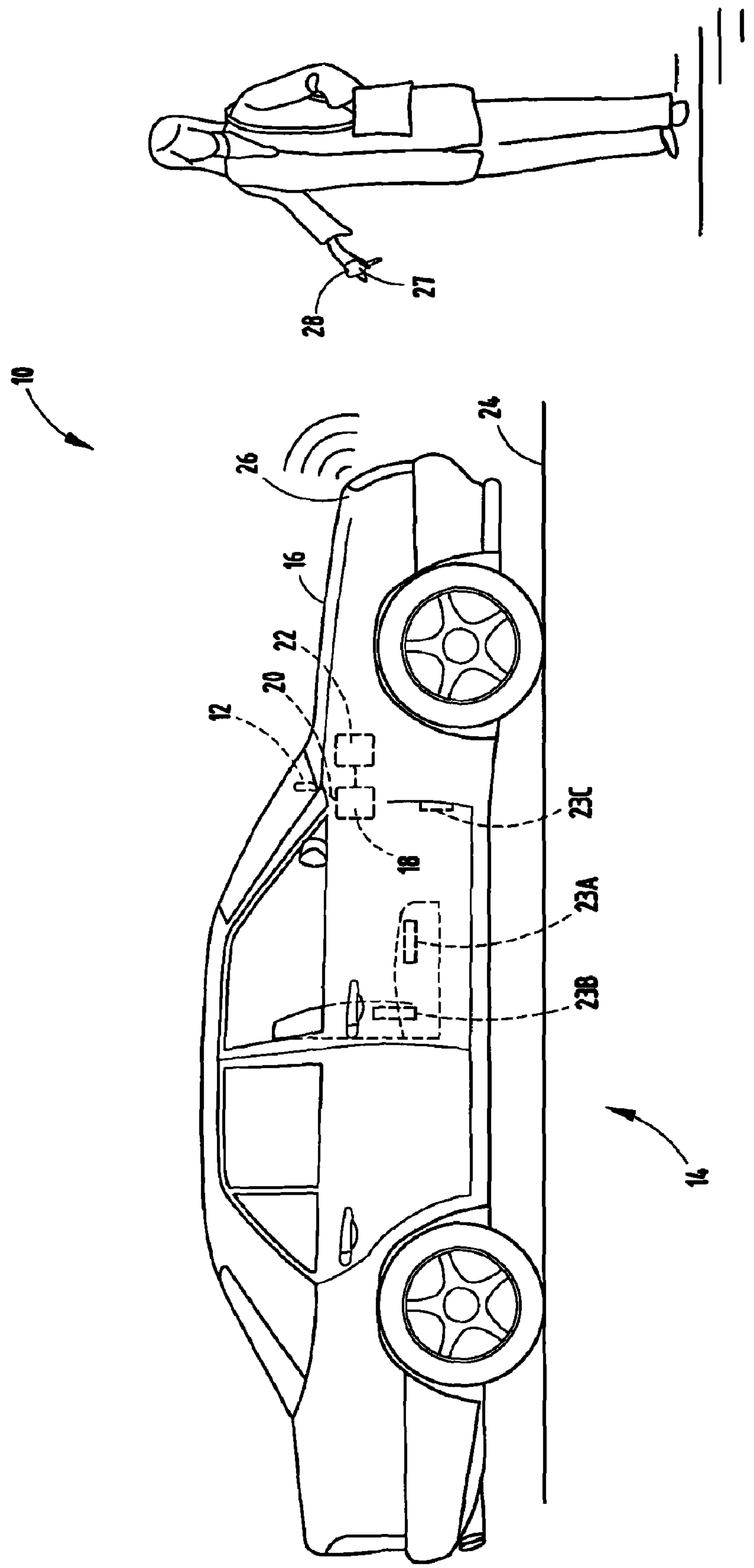
FIG. 1 is a front elevational view of one embodiment of the present invention.

For purposes of description herein the terms "upper," "lower," "right," "left," "rear," "front," "vertical," "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 shown generally in FIG. 1 designates a vehicle location reminder system having a vehicle positioning system 12 operable to provide an approximate location 14 of a vehicle 16 and record the approximate location 14 of the vehicle 16. A status check system 18 monitors use of the vehicle 16 and sends a signal 20 to the vehicle positioning system 12 to record the approximate location 14 of the vehicle 16 when the vehicle 16 is no longer in use. A memory system 22 is connected to the status check system 18 and the vehicle positioning system 12, the memory system 22 being adapted to determine if the approximate location 14 of the vehicle 16, when no longer in use, is in a familiar location 24. An alert system 26 is connected to the memory system 22. The alert system 26 prompts a vehicle user to record data 27 on a mobile device 28 pertaining to the approximate location

14 of the vehicle 16 when the location of the vehicle 16, when no longer in use, is not in a familiar location 24. A replay system 25 is adapted to replay the recorded data 27.

In general, when the vehicle 16 is "no longer in use," that means that use of the vehicle 16 has just ended. This "end" time may be defined in various ways as discussed herein. For example, this time may encompass turning off the vehicle ignition switch, exiting the vehicle 16, closing the door(s), locking the door(s), a predetermined time after doing one or more of these, a distance that the vehicle user has walked away from the vehicle 16, etc. It does not mean an indefinitely long time after the user leaves the vehicle 16. The user is typically the driver of the vehicle 16. However, there are situations generally described herein in which the user may not be the vehicle passenger. For example, the driver may park the vehicle 16 in a parking lot, and a passenger may take the mobile device 28 into various businesses, and then the passenger may need help to find the way back to the vehicle 16. In this case, departure of the passenger from the vehicle 16 may be sensed similarly to some of the ways that departure of the driver from the vehicle 16 can be sensed, such as a door sensor 23C sensing a passenger door opening and closing, or a seat sensor 23A indicating that a person has left a vehicle seat. Additionally, it is contemplated that the vehicle location reminder system 10 may be able to determine that a passenger has left and taken the mobile device 28 from the vehicle 16 before an alert is given. This could be done as described herein, using a proximity sensor 23B that measures the strength of a signal transmitted between the vehicle 16 and the mobile device 28. Thus a "passenger sensor" may consist of a combination of, for example, a seat sensor 23A and proximity sensor 23B. In most cases, the vehicle driver will be the user. Generally, the user is the person who has possession of the mobile device 28. Possession by the driver is presumed in many embodiments herein.

The alert that is given to the vehicle user may be personalized and automatically adjusted according to environmental, vehicle, and security conditions.

The alert system 26 gives an alert, or alert signal, to the vehicle user, as discussed herein. This alert may consist of one or more of an audio, visual, and a vibrational signal. It may be personalized and automatically adjusted according to environmental, vehicle, security, or other conditions. In the case of an audio signal, the user may be provided a menu to choose the sound that is produced (at least one of a beep, whistle, jingle, musical sounds, verbal phrase, verbal message, a user-recorded sound, etc), the loudness with which the sound is produced, its length, etc. A verbal message could include context sensitive information, such as, "low on gas," "rain likely," "door unlocked," "a window is down," etc. The basic loudness of the sound could be selected by the user, and the loudness that is produced by the alert could be automatically adjusted from that basic level depending on how loud the background sounds are. The sound could be produced by the vehicle 16 or by the mobile device 28. In the case of a visual alert, this could be done by flashing the vehicle's external lights, by showing a text or pictorial message on the mobile device 28 (in combination with a sound or vibration), etc.

Referring now to FIGS. 1-6, the illustrated embodiment includes a mobile device 28 that records data 27 on a memory storage device 27A inputted by a user after the user is prompted to input the data 27. The data 27 is information pertaining to the approximate location 14 of the vehicle 16. The mobile device 28 may be a key fob or other recording device capable of storing approximate location information of the vehicle 16. The user is notified by an alert signal or vibration that is activated when the vehicle 16 is no longer in use. After the user records data 27, the data 27 can be replayed by the user using a replay system 25. The data 27 can either be replayed through a speaker on the mobile device 28 in the case of verbal data or replayed (that is, displayed) visually on the mobile device 28 in the case of visual data 27. The replay system 25 may include a switch, pushbutton or other means that the user can activate to cause the data 27 to be replayed.

Figure 2:
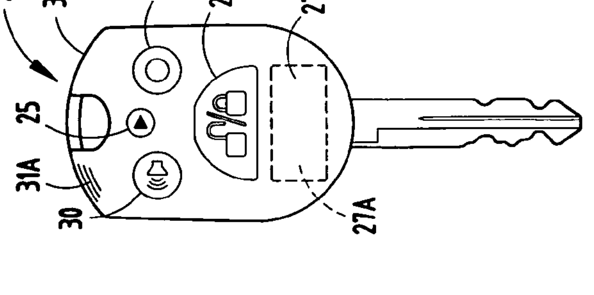
FIG. 2 is a front elevational view of one embodiment of a mobile device of the present invention.
Figure 3:
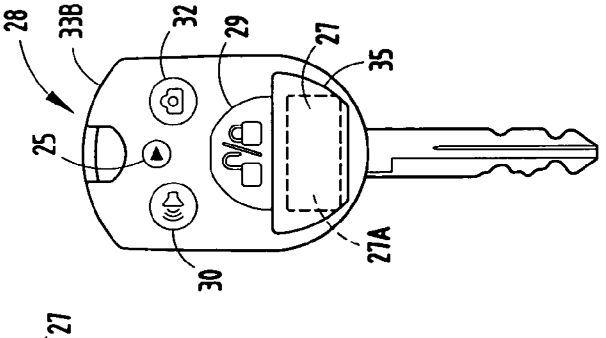
FIG. 3 is a front elevational view of another embodiment of a mobile device.
Figure 3A:
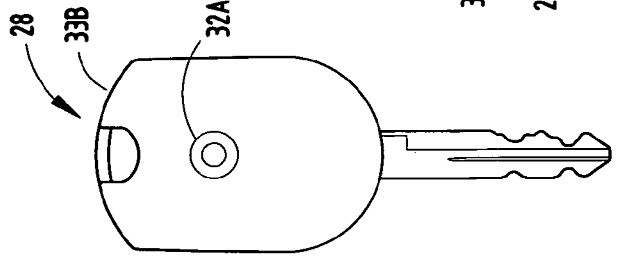
FIG. 3A is a rear elevational view of the mobile device of FIG. 3.

As shown in FIG. 2, the mobile device 28 is in the form of a key fob 33A and includes a lock/unlock button 29, alarm button 30, and an audio record button 31. The lock/unlock button 29 may be connected with a lock sensor that alerts the user that the doors of the vehicle 16 have been unlocked. The audio record button 31 activates an audio recording/playing device 31A in the key fob 33A so that a user may record information relating to the approximate location 14 of the vehicle 16. The audio recording/playing device 31A includes a microphone for recording audio data and a speaker for playing audio data. FIG. 3 illustrates a key fob 33B that includes a lock/unlock button 29. The key fob 33B of FIG. 3 includes an alarm button 30 and a camera activation button 32 which activates an image recording device 32A (FIG. 3A) designed to take digital images of the approximate location 14 of the vehicle 16 for later display on a display screen 35. The digital images are taken after a user has been prompted to record data 27 by the alert system 26 (FIG. 1).

Figure 4:
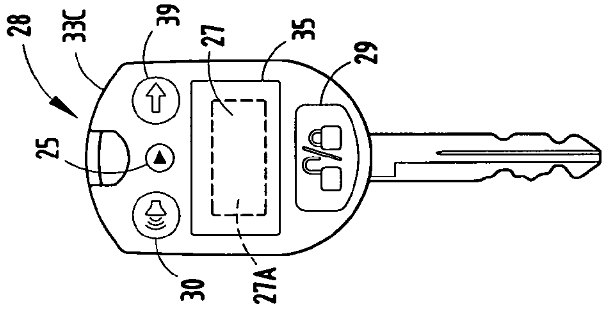
FIG. 4 is a front elevational view of another embodiment of a mobile device.

FIG. 4 illustrates a key fob 33C that is similar to the embodiment shown in FIG. 3 and includes a display screen 35 for relaying stored digital images. The key fob 33C of FIG. 4 also includes an alarm button 30 and a lock/unlock button 29. The key fob 33C has a display screen 35 and a retrieve button 39 that prompts vehicle cameras 90 in the vehicle 16 to relay visual information in the form of digital images from the vehicle cameras 90 back to the key fob 33C for display. In this instance, the vehicle 16 is equipped with vehicle cameras 90 that take images of the surroundings of the vehicle 16 after having been parked and relay that information to the key fob 33C. In one embodiment, the visual data is continually replayed (displayed) on the mobile device 28, so no switch to replay the data 27 is needed.

Figure 5:
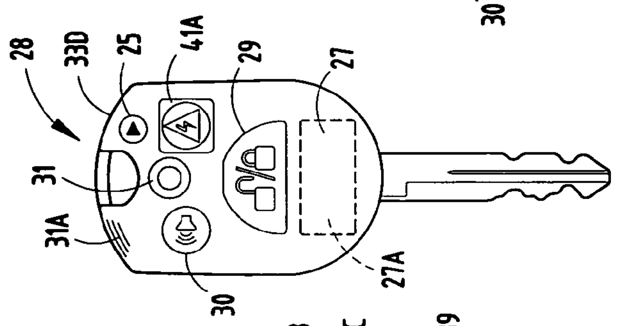
FIG. 5 is a front elevational view of another embodiment of a mobile device.
Figure 6:
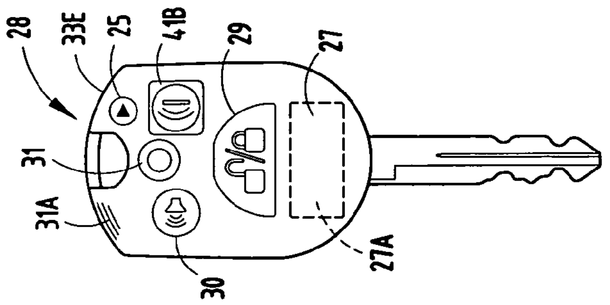
FIG. 6 is a front elevational view of another embodiment of a mobile device.

FIGS. 5 and 6 illustrate embodiments of mobile devices 28 that include controller devices 41A and 41B. Specifically, the key fob 33D of FIG. 5 includes a signal device 41A adapted to send a signal to a vehicle 16 or receive a signal from a vehicle 16. The signal device 41A is designed to communicate with a complimentary signal device on a vehicle 16 and prompt the user to record approximate location information when the user has exceeded a predetermined distance from the vehicle 16. After the user has exceeded that distance, the user is alerted and can engage the record button 31 to record audio information on the audio recording device 31A relating to the vehicle's whereabouts.

FIG. 6 illustrates a key fob 33E that includes a motion detector device 41B that is adapted to detect the difference in vibrations between vehicle motion and the motion of a user walking from a vehicle 16. When the motion detector device 41B has detected such a change, the user is prompted to provide location information 14 by pressing the record button 31 and storing audio location information 14 on the key fob 33E.

Use of the vehicle 16 can be determined in a variety of ways.

The vehicle 16 may be considered no longer in use when the vehicle engine is turned off, the transmission of the vehicle 16 has been put into park, the vehicle keys have been removed from the vehicle ignition switch, the driver's seat-belt has been unlocked, the driver's door has been opened after the vehicle 16 has been driven, the vehicle door has been opened or closed after the vehicle 16 has been driven, a lock button on the vehicle 16 has instructed the vehicle doors to lock, a lock button on the key fob has instructed the vehicle doors to lock, or an RF signal from the key fob has been sent to the vehicle 16 instructing the vehicle doors to be locked. In addition, the vehicle 16 may be considered no longer in use when a button in the vehicle 16 that instructs the driver's door to lock has been pushed after the engine has been turned off, a weight sensor in the driver's seat indicates that the driver has left the seat after the vehicle 16 has been driven, an RF signal from the vehicle 16 between the mobile device 28 and the vehicle 16 begins to diminish, an RF signal from the mobile device 28 between the mobile device 28 and the vehicle 16 begins to diminish, an ultrasound between the mobile device 28 and the vehicle 16 begins to diminish, an optical or infrared signal between the mobile device 28 and the vehicle 16 begins to diminish, a change in the pattern of mechanical vibrations that are characteristic of a moving vehicle 16 and then of a person walking are detected by the mobile device 28, a lateral inclination sensor on the vehicle 16 that detects someone has left the driver's side of the vehicle 16, a plurality of the aforementioned systems for determining when a vehicle 16 is no longer in use, or a plurality of the aforementioned systems in a particular sequence that is characteristic of a driver leaving the vehicle 16.

While the emphasis of this invention is to use a key fob as the mobile device 28, other mobile devices may also be used, including a cellular phone (including an ear bud in some instances), PDA, etc.

Figure 7:
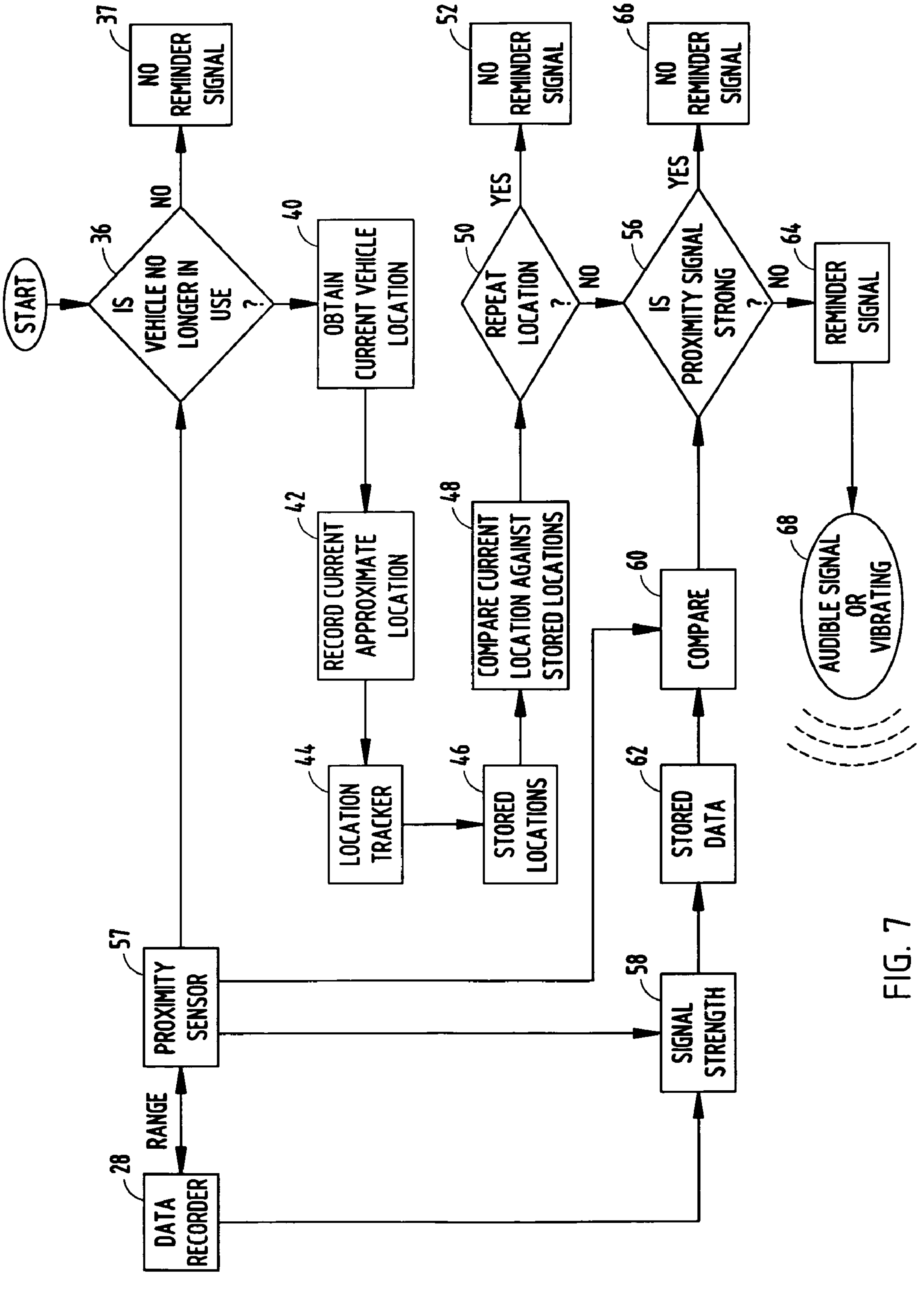
FIG. 7 is a flow chart of one embodiment of the present invention.

Referring now to FIG. 7, as shown in step 36, if the vehicle 16 is still in use then the vehicle location reminder system 10 proceeds to step 37 and no reminder signal is activated. Alternatively, if the vehicle 16 is no longer in use then the vehicle location reminder system 10 proceeds to step 40 and obtains the vehicle's parked location to detect whether the approximate location 14 of the vehicle 16 is a familiar location 24 based on historic parked locations that have been previously recorded. The vehicle's location is analyzed by way of a vehicle positioning system such as global positioning system (GPS). A familiar location 24 is an area where the vehicle 16 is parked repeatedly, such as at the home of the user or at a place of employment. Further, familiar locations 24 are by the vehicle location reminder system 10 based on a general geographic area. More specifically, the vehicle location reminder system 10 considers the possibility that the vehicle 16 may be parked at a familiar location 24 but not precisely in the same place. Accordingly, if the vehicle 16 is parked within a predetermined area of a familiar location 24 then no reminder signal is activated.

To determine whether the vehicle 16 is in a familiar location 24, the vehicle location reminder system 10 obtains the current location by a traditional positioning system such as GPS in step 40, then proceeds to step 42 and records the current approximate location 14 and stores the approximate location 14 in a location tracker, shown in step 44. Next, in step 46, the vehicle location reminder system 10 views previously stored locations and then, in step 48 compares the current approximate location 14 from step 40 against the previously stored locations of step 46. Referring to step 50, if the current approximate location 14 matches a stored location, then the current location constitutes a familiar location 24 and no reminder signal is given. If the current location is not a familiar location 24 then the vehicle location reminder system 10 checks the signal strength between the mobile device 28 and the vehicle 16, as shown in step 56. This is one way to establish repeat, or familiar, locations. Alternatively, or in combination, the user may be provided a way, such as a "remember this place" button, for specifying that a position is a familiar position, such as the user's home. Similarly, the user may be provided a way to delete a position as a familiar place.

Referring again to the embodiment illustrated in FIG. 7, a proximity sensor 57 evaluates the signal strength (step 58) between the vehicle 16 and the signal device mobile device 28 and compares the signal in step 60, against previously stored typical signal strength recordings (step 62). The proximity sensor 57 is located in the vehicle 16. It measures the strength of the signal between a signal transmitter in the mobile device 28 or vehicle 16 and a signal receiver in the other of the mobile device 28 or vehicle 16. When the signal between the mobile device 28 and the vehicle 16 becomes weak as compared to the average signal strength when the vehicle 16 is in use, the reminder signal on the mobile device 28 or on the vehicle 16 is activated. After comparing the current signal strength against previous signal strengths, the vehicle location reminder system 10 sends a reminder signal, in step 64, if the reminder signal is not strong but does not send a reminder signal is the signal is strong (step 66). The reminder signal is sent in step 68 and may be audible or vibratory. Alternatively, instead of using signal strength measured by a proximity sensor 57 as a prompt to relay the reminder signal, any of the systems outlined above to determine if the vehicle 16 is no longer in use could be employed to prompt the reminder signal to be activated.

Figure 8:
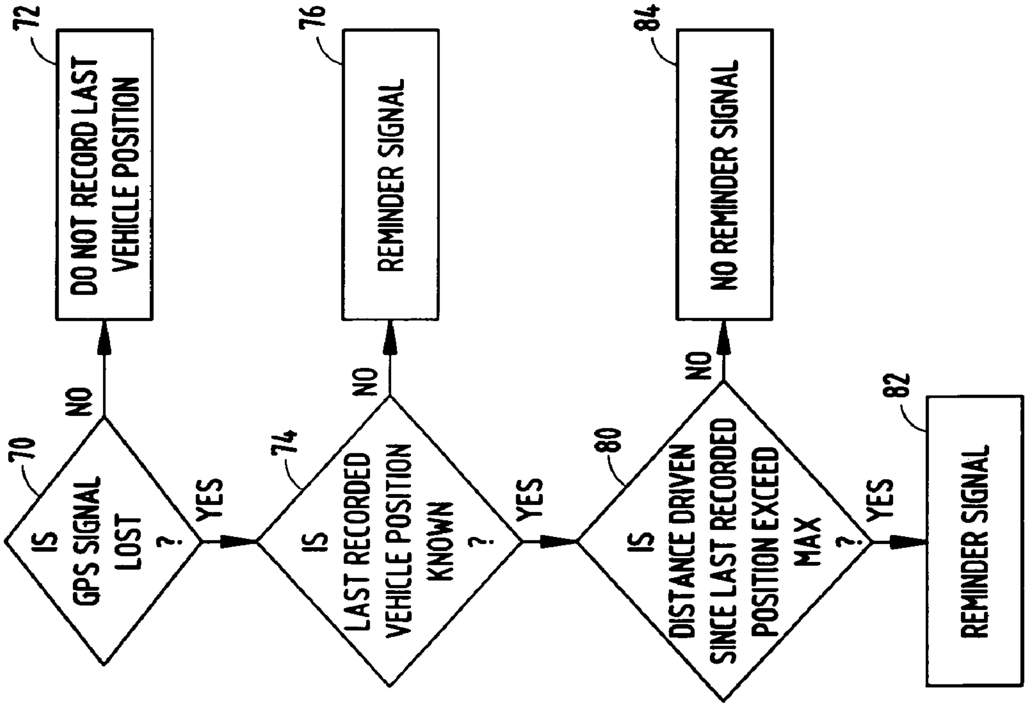
FIG. 8 is a flow chart depicting one embodiment of when a reminder signal is activated.

Referring now to the embodiment illustrated in FIG. 8, in some instances, before the vehicle 16 is parked, the vehicle positioning system locating signal (GPS signal) may become weak or lost, for example when the vehicle 16 enters a building or parking structure. The vehicle location reminder system 10, checks whether the vehicle positioning system signal is lost in step 70. If the signal is not lost, then the vehicle location reminder system 10 does not record the last known vehicle position (step 72). If the signal is lost, then the vehicle location reminder system 10 checks, in step 74, the last recorded vehicle position and determines whether that position is known. If the vehicle position is not known then the vehicle location reminder system 10 prompts a reminder signal to be activated (step 76). If the last recorded position is known then, in step 80, the vehicle location reminder system 10 evaluates the distance driven since the GPS signal was lost. If the distance driven exceeds a predetermined maximum distance then, in step 82, the vehicle location reminder system 10 will prompt the audible signal to be activated. Alternatively, the vehicle location reminder system 10 will proceed to step 84 if the distance driven does not exceed the maximum distance and the vehicle location reminder system 10 will not prompt the signal to be activated to remind the user to record a message related to the vehicle's location.

Figure 9:
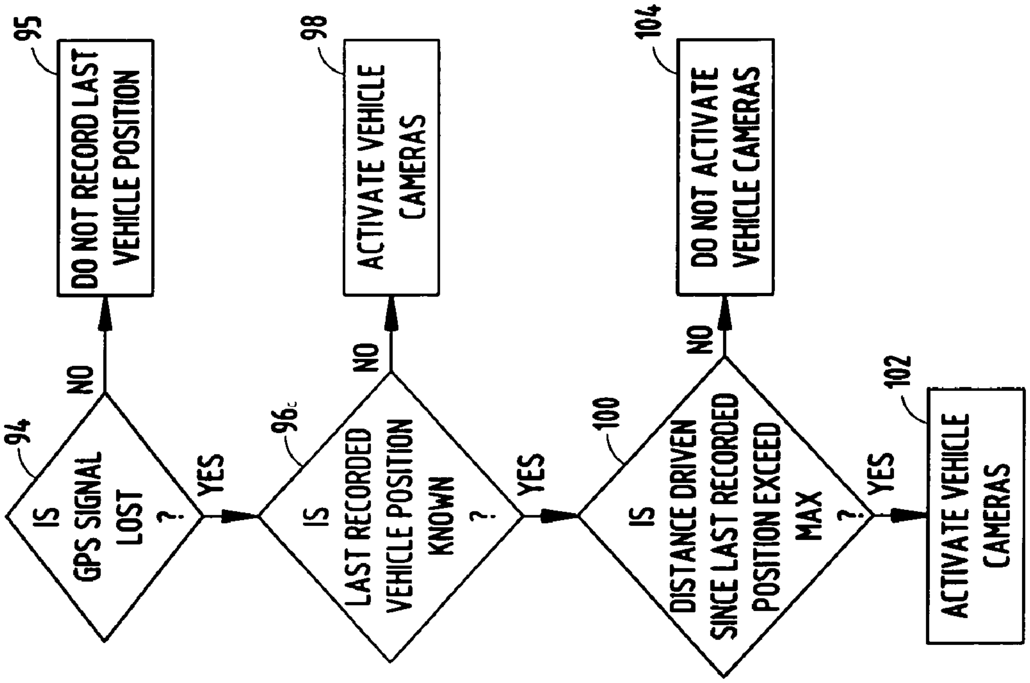
FIG. 9 is a flow chart depicting one embodiment of when vehicle cameras are activated.
Figure 11:
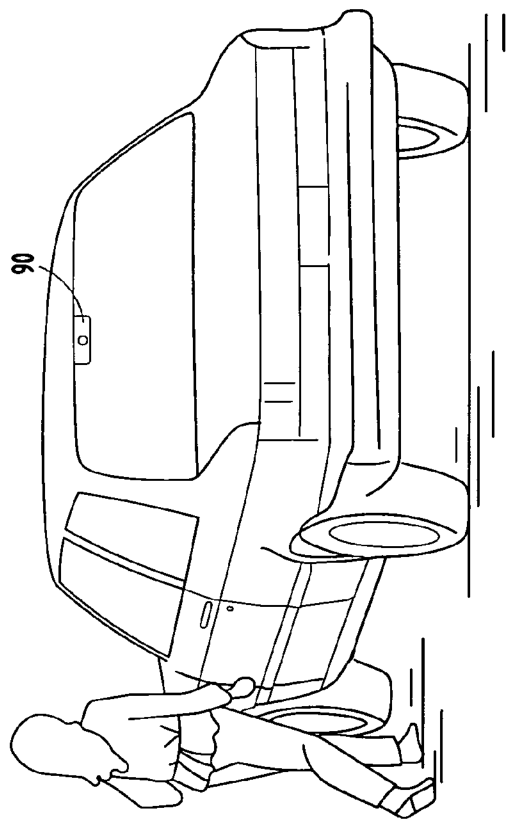
FIG. 11 is a rear perspective view of one embodiment of the present invention with a vehicle camera.

Referring now to the embodiment illustrated in FIG. 9, one or more vehicle cameras 90 (FIG. 11) may be positioned inside the vehicle 16 that are designed to take one or more images of the surroundings of the vehicle 16 prior to or after the vehicle 16 is no longer in use. In the event the vehicle 16 includes cameras 90, then the cameras 90 will be activated in a similar manner to the protocol in which the reminder signal discussed above with reference to FIG. 8 is activated. More specifically, the vehicle location reminder system 10 evaluates whether the vehicle positioning system signal is lost in step 94. If the vehicle positioning system 12 is not lost then the last vehicle position in not recorded (step 95). If the locating signal is lost then the vehicle location reminder system 10 checks the last recorded vehicle position and determines whether that position is known (step 96). If the vehicle position is not known, then the vehicle location reminder system 10 goes to step 98 and prompts the vehicle cameras 90 to be activated. If the last recorded position is known then the vehicle location reminder system 10 evaluates the distance driven, in step 100, since the locating signal was lost. If the distance driven exceeds a predetermined maximum distance then the vehicle location reminder system 10 will prompt the vehicle cameras 90 to become activated in step 102. Alternatively, if the distance driven does not exceed the maximum distance then the vehicle location reminder system 10 will go to step 104 and not prompt the vehicle cameras 90 to be activated. The vehicle cameras 90 may operate to take photos of the vehicle's parked location, take photos of the vehicle 16 en route to a parked location, such as in a parking ramp, or take streaming video to show the path taken by the vehicle 16 prior to being parked.

Figure 10:
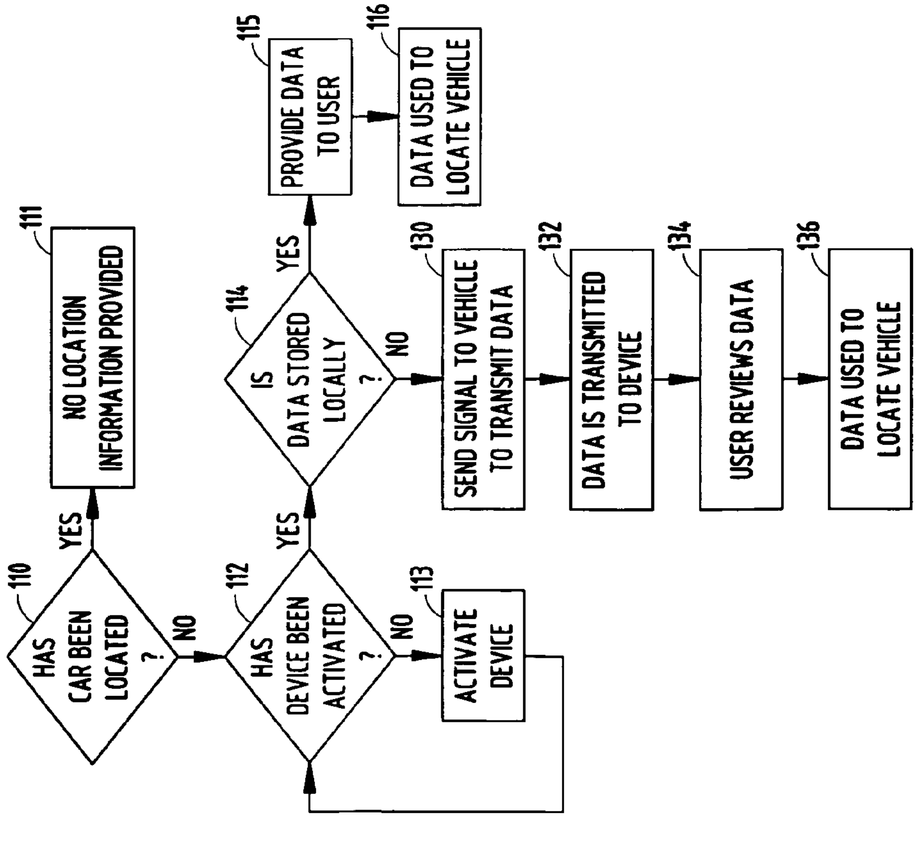
FIG. 10 is a flow chart depicting one embodiment of how the present invention may be used.

FIG. 10 illustrates one embodiment of how the process by which the vehicle location reminder system 10 is used. When a user is returning to the vehicle 16 and can readily find the vehicle 16 (step 110), no location information is provided to the user (step 111). Alternatively, if the vehicle 16 cannot be located, the user checks the mobile device 28 and confirms that the mobile device 28 is activated (step 112). If the mobile device 28 has not been activated, the user activates the device 28 in step 113. If the location data 27 is stored locally (step 114), or more specifically, audibly or visually stored in the mobile device 28 then the information can be relayed from the mobile device 28 (step 115) directly to the user to locate the vehicle 16 (step 116). It is contemplated that the user could click a button on the mobile device 28, to relay vehicle location information to the user when the mobile device 28 does not receive a return signal from the vehicle 16 that the vehicle 16 is nearby. The location data 27 is then used by the user to locate the vehicle 16.

Referring again to FIG. 10, if the data 27 is not stored locally then the vehicle location reminder system 10 prompts the mobile device 28 to transmit a signal requesting information, in step 130, to the vehicle 16. The previously stored location information is then transmitted back to the mobile device 28 from the vehicle 16 in step 132, and the user can then use the information to ascertain the whereabouts of the vehicle 16 in step 134. It is contemplated that the vehicle 16 may send prerecorded audio information by the user that is stored in the vehicle 16, visual information captured by vehicle cameras 90 disposed on the vehicle 16 and which send images of the vehicles whereabouts to a mobile device display, a camera/image recording device 32A on the mobile device 28, GPS information provided by the vehicle's vehicle positioning system device, etc. This information is then used to locate the vehicle 16 (step 136).

In one embodiment it is contemplated that multiple digital images can be taken while the vehicle 16 is still in use or moving. The images could, for example, be taken in the forward vehicle direction once per second (and suppressed if a vehicle 16 stops moving for several seconds). When this sequence of images is transmitted to the mobile device 28, it can be replayed at a faster rate, allowing the user to see the path that was taken in the last few minutes before the vehicle 16 was parked. This feature is believed to be particularly useful in parking structures. The user can also control the speed that the images are replayed, and have the ability to freeze a particular frame if the images are streaming video. For example, a sign that shows what floor the user parked the vehicle 16 on can be recalled and viewed. The images can also be replayed in reverse order, starting for example with the final image. This feature places more emphasis on the final parking location.

It is contemplated that there are different ways to determine if a location is a familiar location 24. For example, if a location is visited once per week then the location would be a familiar location 24. If a given amount of time passes between visits to particular location, the particular location may lose status as a familiar location 24 and become a new location.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle location reminder system comprising:
- a vehicle positioning system operable to provide an approximate location of a vehicle and record the approximate location of the vehicle;
- a status check system that monitors use of the vehicle and that sends a signal to the vehicle positioning system to record the approximate location of the vehicle when the vehicle is no longer in use;
- a memory system connected to the status check system and the vehicle positioning system, the memory system adapted to determine if the approximate location of the vehicle, when no longer in use, is in a familiar location;
- an alert system connected to the memory system wherein the alert system prompts a vehicle user within a range to record data pertaining to the approximate location of the vehicle after the vehicle is no longer in use, when the location of the vehicle is not in a familiar location, and before the vehicle user moves outside the range; and
- a replay system adapted to replay the recorded data.

2. The vehicle location reminder system of claim 1, further comprising:
- a mobile device that records data provided by the vehicle user.

3. The vehicle location reminder system of claim 2, wherein:
- the mobile device includes an audio recorder for recording data provided by the vehicle user and the replay system includes a speaker for replaying the data audibly.

4. The vehicle location reminder system of claim 1, further comprising:
- a passenger sensor that instructs the status check system to prompt the vehicle positioning system to record data relating to the approximate location of the vehicle once a passenger has left the vehicle.

5. The vehicle location reminder system of claim 1, wherein:
- the status check system does not prompt the vehicle to record data relating to the approximate location of the vehicle until the vehicle has been locked and a predetermined time has elapsed since the vehicle was locked.

6. The vehicle location reminder system of claim 1, comprising:
- a proximity sensor that measures a signal strength of a signal transmitted between the vehicle and a mobile device and that prompts the vehicle user to record data pertaining to the approximate vehicle location when the signal strength begins to diminish.

7. The vehicle location reminder system of claim 1, wherein:
- the alert system prompts the vehicle user to record data pertaining to the approximate location of the vehicle when the last recorded approximate location of the vehicle by the vehicle positioning system, before the vehicle is parked, is not a familiar location.

8. The vehicle location reminder system of claim 1, wherein:

the alert system sends an alert to the vehicle user that is personalized and automatically adjusted according to environmental, vehicle, and security conditions.

9. The vehicle location reminder system of claim 1, wherein;

a position is recorded by the vehicle user as a familiar location or not a familiar location and the memory system records the position of the vehicle when no longer in use.

10. A vehicle location reminder system comprising:

a vehicle positioning system operable to provide an approximate location of a vehicle and record the approximate location of the vehicle;

a status check system that monitors use of the vehicle and that sends a signal to the vehicle positioning system to record the approximate location of the vehicle when the vehicle is no longer in use;

a memory system connected to the status check system and the vehicle positioning system, the memory system adapted to determine if the approximate location of the vehicle when the vehicle is no longer in use is a familiar location;

an alert system connected to the memory system wherein the alert system prompts a vehicle user within a range to record data pertaining to the approximate location of the vehicle after being parked, when the location of the vehicle is not a familiar location, and before the vehicle user moves away outside the range; and a mobile device having an information recording system adapted to record and store data related to the approximate location of the vehicle.

11. The vehicle location reminder system of claim 10, wherein:

the mobile device includes an audio recorder for recording approximate location data provided by the vehicle user and a replay system having a speaker for audibly replaying audio data.

12. A method for determining the location of a vehicle, comprising:

installing a global positioning satellite system into the vehicle;

installing a notification system into the vehicle;

providing a module that evaluates when the vehicle is no longer in use;

recording the last known approximate location of the vehicle when no longer in use;

evaluating whether the last known approximate location is a familiar location;

sending approximate location data from the notification system and global positioning satellite system to an alert system;

sending an alert from the module to a vehicle user within a range, after the vehicle is no longer in use, when the approximate location is determined to not be familiar, and before the vehicle user moves outside the range; and providing a recording device for receiving approximate location data from the vehicle user.

13. The method of claim 12, wherein the step of providing a recording device further includes providing an audio recorder adapted to record audible data related to the approximate location of the vehicle and wherein the audio recorder replays the data for the vehicle user.

14. The method of claim 12, wherein the step of providing a recording device further includes providing an image recorder adapted to record image information related to the approximate location of the vehicle and providing a display screen on the recording device.

15. The method of claim 12, further comprising:

receiving user occupancy information from a seat sensor located in a seat of the vehicle.

16. The method of claim 12, further comprising:

receiving a signal from a door sensor indicating that a door on the vehicle has been opened.

17. The method of claim 12, further comprising:

providing a proximity sensor that measures the strength of a signal between the recording device and the vehicle.

18. The method of claim 12, further comprising:

receiving a signal from a lock sensor that indicates when a door of the vehicle has been locked.

* * * * *